United States Patent [19]

Shiomi et al.

[11] Patent Number: 4,900,338
[45] Date of Patent: Feb. 13, 1990

[54] GAS SEPARATION/EXTRACTION APPARATUS FOR SEPARATING AND EXTRACTING A DESIRED GAS FROM A GAS MIXTURE AND A BALANCE VALVE THEREFOR

[75] Inventors: Iwaji Shiomi; Haruki Nakao, both of Tokyo, Japan

[73] Assignee: Nikki Co., Ltd., Tokyo, Japan

[21] Appl. No.: 340,691

[22] Filed: Apr. 20, 1989

[30] Foreign Application Priority Data

Jun. 29, 1988 [JP] Japan ............................ 63-86343[U]

[51] Int. Cl.⁴ ............................................. B01D 53/04
[52] U.S. Cl. ...................................... 55/161; 55/189; 55/387
[58] Field of Search ................ 55/25, 26, 33, 74, 75, 55/161–163, 189, 387, 389

[56] References Cited

U.S. PATENT DOCUMENTS

| | | | |
|---|---|---|---|
| 3,182,435 | 5/1965 | Axt | 55/33 X |
| 3,236,028 | 2/1966 | Rutan | 55/33 |
| 3,486,303 | 12/1969 | Glass et al. | 55/162 |
| 4,169,715 | 10/1979 | Eriksson | 55/161 |
| 4,331,457 | 5/1982 | Mörner | 55/163 |
| 4,534,346 | 8/1985 | Schlaechter | 55/25 X |
| 4,561,865 | 12/1985 | McCombs et al. | 55/25 |
| 4,764,189 | 8/1988 | Yanagawa et al. | 55/163 |
| 4,806,134 | 2/1989 | Lhota | 55/162 |

FOREIGN PATENT DOCUMENTS

| | | | |
|---|---|---|---|
| 0262934 | 4/1988 | European Pat. Off. | 55/161 |
| 3504884 | 7/1986 | Fed. Rep. of Germany | 55/162 |

*Primary Examiner*—Robert Spitzer
*Attorney, Agent, or Firm*—Nixon & Vanderhye

[57] ABSTRACT

A gas separation/extraction apparatus comprises a tank for separating and extracting a specific gas element from a gas mixture, the tank containing an adsorbent for adsorbing the gas element from the gas mixture, a pump having a cylinder and a piston housed therein, the pump being adapted to alternately pressurize and decompress the inside of the tank as the piston reciprocates, a first three-way solenoid valve connected between an exhaust port of the tank and a suction port of the pump, a second three-way solenoid valve connected between a discharge port of the pump and the suction port of the tank, and a pressure balance unit connected between the second three-way solenoid valve and a suction port of the tank, and adapted gradually to eliminate a difference in pressure between the tank and the pump as the tank is switched from a decompressed state to a pressurized state.

4 Claims, 9 Drawing Sheets

GAS SEPARATION/EXTRACTION APPARATUS FOR SEPARATING AND EXTRACTING A DESIRED GAS FROM A GAS MIXTURE AND A BALANCE VALVE THEREFOR

BACKGROUND OF THE INVENTION

1. Field of the Invention

The present invention relates to a gas separation/extraction apparatus for separating a desired gas from air or various other gas mixtures by pressure swing adsorption and a balance valve therefor.

2. Description of the Related Art

FIG. 11 shows a gas separation/extraction apparatus for separating oxygen from air by pressure swing adsorption. This apparatus has previously been proposed by the inventor hereof.

As shown in FIG. 11, the gas separation/extraction apparatus comprises gas separation tank 1, first three-way solenoid valve 2, free-piston pump unit 3, and second three-way solenoid valve 4.

Gas separation tank 1 has inlet port 6 for air as a gas mixture, outlet port 7 for separated oxygen, and exhaust port 8 for waste gas. The tank contains adsorbent 10 for adsorbing nitrogen under pressure.

In free-piston pump unit 3, as shown in FIGS. 12A and 12B, free piston 15, urged by means of spring 14, is slidably housed in cylinder 13 which communicates with suction port 11 and discharge port 12. Electromagnet 16 is provided on the outer periphery of cylinder 13. It attracts piston 15 against the urging force of spring 14. In pump unit 3, as shown in FIG. 12A, when electromagnet 16 is actuated by means of one half wave from a commercial AC power source so that piston 15 is attracted in the left direction in FIG. 12A, resisting the urging force of spring 14, suction valve 17 is opened to introduce air into cylinder chamber 18. Then, in response to the other half wave for the change of the current direction, the drive of electromagnet 16 is stopped by the agency of diode 16A. At this time, free piston 15 is slid in the right direction in FIG. 12B by the urging force of spring 14, thereby compressing the air in chamber 18, and opening discharge valve 20 to cause the air to be discharged through discharge port 12. In this gas separation/extraction apparatus, free-piston pump unit 3 doubles as a vacuum pump and a compressor.

In the apparatus described above, first three-way solenoid valve 2 has a passage, which connects exhaust port 8 of gas separation tank 1 and suction port 11 of free-piston pump unit 3, and a passage through which air is introduced and led to port 11. Normally or in the OFF state as shown in FIG. 11, valve 2 is kept open so that air is introduced and led to port 11. In the ON state, the valve is switched to allow exhaust port 8 of tank 1 to communicate with suction port 11.

Second three-way solenoid valve 4 has a passage, which connects discharge port 12 of free-piston pump unit 3 and inlet port 6 of gas separation tank 1, and a passage through which port 12 opens to the outside air. Normally or in the OFF state, as shown in FIG. 11, discharge port 12 is caused to communicate with inlet port 6 of tank 1. In the ON state, the valve is switched to allow port 12 to open to the outside air.

Thus, by ON-OFF controlling first and second three-way solenoid valves 2 and 4 with a predetermined timing, decompression and pressurization of gas separation tank 1 can be repeatedly performed by means of free-piston pump unit 3. More specifically, tank 1 is pressurized and decompressed when solenoid valves 2 and 4 are OFF and ON, respectively.

The following is a description of the operation for separating and extracting oxygen in air by means of the gas separation/extraction apparatus of this type.

If free-piston pump unit 3 is first started with three-way solenoid valves 2 and 4 off, air introduced through first solenoid valve 2 is compressed in cylinder chamber 18 of pump unit 3 (FIG. 12B), and the compressed air flows through second solenoid valve 4 into gas separation tank 1, thereby pressurizing the tank. When the inside pressure of tank 1 attains a predetermined level, nitrogen in the air is adsorbed by adsorbent 10, so that tank 1 is filled with enriched oxygen. By opening outlet port 7 to take out the oxygen gas in tank 1 in this state, oxygen in the air can be separated and extracted.

Subsequently, outlet port 7 of gas separation tank 1 is closed, first and second three-way solenoid valves 2 and 4 are switched on, and free-piston pump unit 3 is started. Thereupon, the residual gas in gas separation tank 1 is sucked into cylinder chamber 18 (see FIG. 12A). By the action of pump unit 3, the sucked residual gas is guided through discharge port 12 to solenoid valve 4, and then discharged into the outside air. Thus, tank 1 is gradually decompressed. When the pressure of the tank is reduced to a predetermined level, the nitrogen having so far been adsorbed by adsorbent 10 starts to be released. The residual gas, consisting mainly of the released nitrogen gas, is discharged through second solenoid valve 4 into the outside air. When valves 2 and 4 are switched off after the discharge of the residual gas is finished, free-piston pump unit 3 operates as a compressor, so that air is resupplied into gas separation tank 1 under pressure.

Thus, oxygen in air is separated and extracted in succession by switching three-way solenoid valves 2 and 4 and repeating the pressurization and decompression of gas separation tank 1.

This trial machine, however, has the following problems. Since free piston 15 of free-piston pump unit 3 is designed so as to run against head-side end face 21 of cylinder 13, abutting portions of the two members may be damaged, and a great impactive noise is produced by the collision. These situations are attributable to the following causes. If solenoid valves 2 and 4 are simultaneously turned off to switch the operation mode of pump unit 3 from vacuum pump operation to compressor operation, cylinder chamber 18 is connected to gas separation tank 1 under vacuum, and therefore, is decompressed. As a result, a bumper effect (air cushion effect) against the compressive movement of free piston 15 is reduced.

In order to solve these problems, in the improved trial machine, a branch portion is provided in a passage extending from three-way solenoid valve 4 to gas separation tank 1, as shown in FIG. 11, and two-way solenoid valve 5, which has an orifice and a selector valve, is disposed at the end portion of branch passage 22. Normally or in the OFF state, valve 5 closes the end portion of passage 22. In the ON state, valve 5 switches passage 22 to the orifice side, thereby making the passage open to the outside air so that the pressure inside cylinder 13 of free-piston pump unit 3 is restored to the level of the atmospheric pressure.

Constructed in this manner, however, the improved trial machine requires a complicated control circuit, as shown in FIG. 13. In the circuit diagram of FIG. 13, symbols S1, S2 and S3 designate solenoid valves, T1, T2 and T3 designate timers used to determine the ON-operation period of valves S1, S2 and S3, respectively, and R1, R2 and R3 designate relays for turning on and off valves S1, S2 and S3, respectively. Subscripts 1, 2 and 3 attached to characters S, R and T are indicative of circuits for operating first and second three-way solenoid valves 2 and 3 and two-way solenoid valve 5, respectively. Solenoid valves S1, S2 and S3 are timing-controlled in accordance with the time chart of FIG. 14. Thus, when the operation mode is switched from decompression to pressurization (or when solenoid valves 2 and 4 are turned off), the timing for the switching is shifted so that S2 is turned off with a delay of time t after S1. Two-way solenoid valve 5 or S3 is turned on within time t. Thus, even though first three-way solenoid valve 2 is turned off to introduce air, the compressed air is discharged through second three-way solenoid valve 4 into the atmosphere for the period of time t, without being immediately fed into gas separation tank 1. Meanwhile, two-way solenoid valve 5 is opened to allow air to be introduced through an orifice passage therein within the period of time t. The introduced air is temporarily fed into tank 1 under vacuum through branch passage 22, thereby increasing the pressure of the tank, and solenoid valve 5 is opened thereafter. Then, second three-way solenoid valve 4 is turned off to connect discharge port 12 of free-piston pump unit 3 and inlet port 6 of tank 1.

If cylinder chamber 18 is caused to communicate with gas separation tank 1 whose internal pressure thus is increased, the pressure difference between the head and tail sides of free piston 15 is small, and the bumper effect of chamber 18 against the compressive motion of the piston is slightly enhanced. Accordingly, free piston 15 is somewhat restrained from running against head-side end face 21. Thus, the problems of the damage to the abutting portions of end face 21 and piston 15 and the impactive noise can be solved in a way.

In order to provide the aforementioned improved trial machine with two-way solenoid valve 5 having the orifice passage therein, however, the machine must be furnished with an additional electric circuit for driving valve 5. Thus, the circuit configuration is further complicated, and equipment costs are high.

In the arrangement described above, moreover, air is guided into gas separation tank 1 through the orifice. In raising the vacuum pressure inside gas separation tank to the level of the atmospheric pressure, however, the conventional arrangement requires too much time to increase the pressure to a level such that free piston 15 cannot run against head-side end face 21. Thus, the operating efficiency is not very high.

If ON-operation time t for two-way solenoid valve 5 is made unduly high, furthermore, the operating efficiency is lowered correspondingly. If time t is too short, on the other hand, free piston 15 inevitably runs against end face 21. Thus, it is difficult to set time t properly, and therefore, designing of the circuits for driving the apparatus requires scrupulous care and a lot of time.

SUMMARY OF THE INVENTION

An object of the present invention is to provide a pressure balance valve, which prevents a negative pressure inside a gas separation tank from being transmitted to a pump unit when a process for decompressing the tank is switched over to a process for pressurizing the tank.

Another object of the invention is to provide a gas separation/extraction apparatus, in which the pressure inside a cylinder of the pump unit is increased to a suitable level in a short period of time, at the time of the switching operation, so that a piston in the pump unit cannot run against the wall of the cylinder.

The above objects of the invention are achieved by a gas separation/extraction apparatus and a balance valve therefor as follows.

The gas separation/extraction apparatus comprises tank means for separating and extracting a specific gas element from a gas mixture, the tank means having an suction port, an exhaust port, and adsorption means for adsorbing the gas element from the gas mixture; pump means having a suction port, a discharge port, a cylinder, and a piston housed in the cylinder, the pump means being adapted to alternately pressurize and decompress the inside of the tank means as the piston reciprocates; a first three-way solenoid valve connected between the exhaust port of the tank means and the suction port of the pump means; a second three-way solenoid valve connected between the discharge port of the pump means and the suction port of the tank means; and pressure balance means connected between the second three-way solenoid valve and the suction port of the tank means, and adapted gradually to eliminate a difference in pressure between the tank means and the pump means as the tank means is switched from a decompressed state to a pressurized state.

The balance valve according to the present invention comprises an intake port for a gas mixture, an outlet port through which a compressed gas flows out into a gas separation tank, an inlet port for the compressed gas connecting with a discharge port of a pump unit, a negative-pressure valve for opening and closing the intake port for the gas mixture, and a pressure valve for opening and closing the inlet port for the compressed gas.

According to the present invention, the special pressure balance means is interposed between the discharge port of the free-piston pump unit and the gas intake port of the gas separation tank. When decompressive exhaust operation for the tank is switched to compressive supply operation, therefore, the balance means produces a pressure relief effect. Accordingly, the vacuum pressure in the gas separation tank cannot directly influences the discharge port side of the pump unit. Thus, the bumper effect of a cylinder chamber is prevented from being reduced, and a free piston can be securely prevented from running against a head-side end face of the cylinder.

When the decompressive exhaust operation for the gas separation tank is switched to the compressive supply operation, moreover, a plenty of gas mixture, besides a gas mixture supplied from the free-piston pump unit, is fed into the tank through the gas intake port of the balance means. Accordingly, a vacuum in the gas separation tank can be broken in an instant, thus ensuring a substantial improvement in the efficiency of gas separating operation.

Furthermore, the construction of the pressure balance means is so simple that the gas separation apparatus, which incorporates the balance means, also has a simple construction. Thus, the equipment costs can be lowered.

According to an aspect of the present invention, if the first and second three-way solenoid valves are turned off, the free-piston pump unit is switched from the decompression mode for the gas separation tank to the gas pressurization mode. Since a vacuum is formed in the tank during this mode switching, the pressure valve of the balance valve cuts off the compressed gas inlet port from the compressed gas outlet port, by means of its own closing force (e.g., weight of the valve plus the closing force of a spring) and the force of negative pressure on the tank side. Thus, the discharge port side of the pump unit cannot be influenced by the negative pressure inside the gas separation tank, so that a piston shock cannot be caused inside the cylinder of the pump unit.

When the pressure of the gas compressed by the free-piston pump unit is increased so that it resists the closing force of the pressure valve, after the start of the pressurizing operation, the pressure valve opens, so that the compressed gas enters a valve chamber of the balance valve in an instant. When the pressure valve is opened by the inflow of the compressed gas, the negative pressure inside the gas separation tank makes the internal pressure of the valve chamber lower than the pressure of the compressed gas, and the negative-pressure valve is opened by the resulting differential pressure. As the negative-pressure valve is opened in this manner, a plenty of gas mixture, i.e., air, is introduced through the gas mixture intake port into the valve chamber, so that the pressure inside the valve chamber is instantaneously increased to the level of the atmospheric pressure. The gas mixture thus introduced into the valve chamber through the intake port, along with the gas mixture supplied through the compressed gas inlet port, is fed through the compressed gas outlet port into the gas separation tank. By the inflow of this large quantity of gas mixture, the vacuum pressure in the tank is raised to the pressure level of the gas mixture in an instant. Thereafter, the tank is brought to a pressurized state by the operation of the free-piston pump unit.

When the pressurized state is established in this manner, the pressure inside the valve chamber is higher than the pressure of the gas mixture, so that the negative-pressure valve at the gas mixture intake port is closed. Meanwhile, the compressed gas mixture delivered from the free-piston pump unit continues to be fed into the gas separation tank. In the tank, the gas mixture is compressed and adsorbed by an adsorbent. Thus, only a desired gas is separated and extracted. The extracted gas is retrieved through an outlet port.

DETAILED DESCRIPTION OF THE PREFERRED EMBODIMENTS

Preferred embodiments of the present invention will now be described in detail with reference to the accompanying drawings.

Figure 1A:
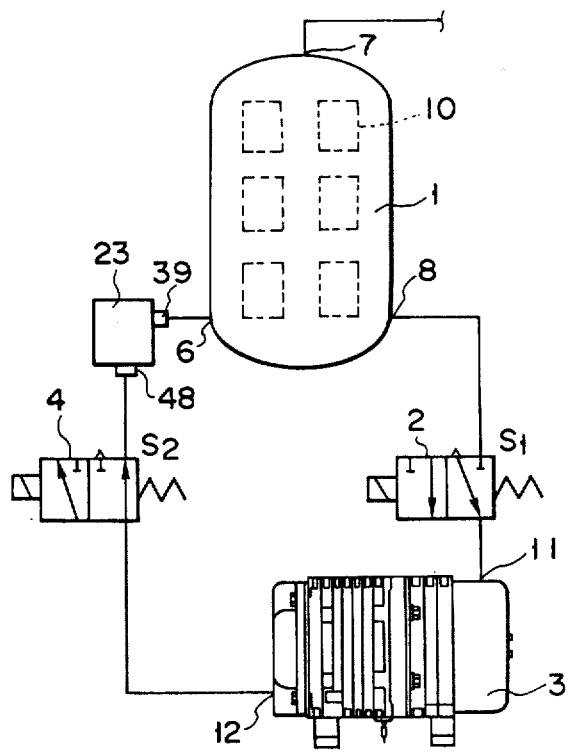
FIG. 1A is a fluid circuit diagram of a gas separation/extraction apparatus according to a first embodiment of the present invention.

As shown in FIG. 1A, a gas separation/extraction apparatus according to a first embodiment of the present invention comprises gas separation tank 1, first three-way solenoid valve 2, free-piston pump unit 3, second three-way solenoid valve 4, and balance valve 23.

Gas separation tank 1 has inlet port 6 for air as a gas mixture, outlet port 7 for separated oxygen, and exhaust port 8 for waste gas. The tank contains adsorbent 10 for adsorbing nitrogen under pressure.

Figure 1B:
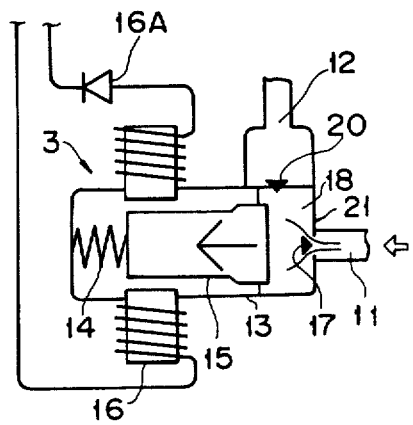
FIGS. 1B and 1C are schematic sectional views of a pump unit shown in FIG. 1A.
Figure 1C:
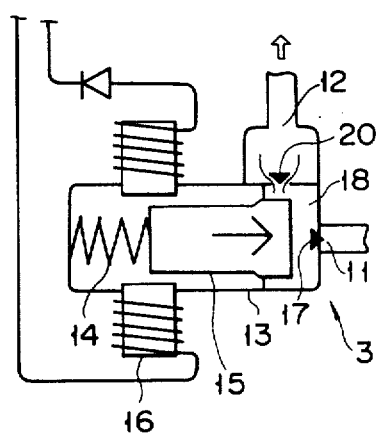

In free-piston pump unit 3, as shown in FIGS. 1B and 1C, free piston 15, urged by means of spring 14, is slidably housed in cylinder 13 which communicates with suction port 11 and discharge port 12. Electromagnet 16 is provided on the outer periphery of cylinder 13. It attracts piston 15 against the urging force of spring 14. In pump unit 3, as shown in FIG. 1B, when electromagnet 16 is actuated by means of one half wave from a commercial AC power source so that piston 15 is attracted in the left direction in FIG. 1B, resisting the urging force of spring 14, suction valve 17 is opened to introduce air into cylinder chamber 18. Then, in response to the other half wave for the change of the current direction, the drive of electromagnet 16 is stopped by the agency of diode 16A. At this time, free piston 15 is slid in the right direction in FIG. 1C by the urging force of spring 14, thereby compressing the air in chamber 18, and opening discharge valve 20 to cause the air to be discharged through discharge port 12. In this gas separation/extraction apparatus, free-piston pump unit 3 doubles as a vacuum pump and a compressor.

In the apparatus described above, first three-way solenoid valve 2 has a passage, which connects exhaust port 8 of gas separation tank 1 and suction port 11 of free-piston pump unit 3, and a passage through which air is introduced and led to port 11. Normally or in the OFF state, as shown in FIG. 1A, valve 2 is kept open so that air is introduced and led to port 11. In the ON state, the valve is switched to allow exhaust port 8 of tank 1 to communicate with suction port 11.

Second three-way solenoid valve 4 has a passage, which connects discharge port 12 of free-piston pump unit 3 and inlet port 6 of gas separation tank 1, and a passage through which port 12 opens to the outside air. Normally or in the OFF state, as shown in FIG. 1A, discharge port 12 is caused to communicate with inlet port 6 of tank 1. In the ON state, the valve is switched to allow port 12 to open to the outside air.

Thus, by ON-OFF controlling first and second three-way solenoid valves 2 and 4 with a predetermined timing, decompression and pressurization of gas separation tank 1 can be repeatedly performed by means of free-piston pump unit 3. More specifically, tank 1 is pressurized and decompressed when solenoid valves 2 and 4 are OFF and ON, respectively.

The following is a description of the operation for separating and extracting oxygen in air by means of the gas separation/extraction apparatus according to the present invention.

If free-piston pump unit 3 is first started with three-way solenoid valves 2 and 4 off, air introduced through first solenoid valve 2 is compressed in cylinder chamber 18 of pump unit 3 (FIG. 1C), and the compressed air flows through second solenoid valve 4 into gas separation tank 1, thereby pressurizing the tank. When the pressure of tank 1 attains a predetermined level, nitrogen in the air is adsorbed by adsorbent 10, so that tank 1 is filled with enriched oxygen. By opening outlet port 7 to take out the oxygen gas in tank 1 in this state, oxygen in the air can be separated and extracted.

Subsequently, outlet port 7 of gas separation tank 1 is closed, first and second three-way solenoid valves 2 and 4 are switched on, and free-piston pump unit 3 is started. Thereupon, the residual gas in gas separation tank 1 is sucked into cylinder chamber 18 (see FIG. 1B). By the action of pump unit 3, the sucked residual gas is guided through discharge port 12 to second solenoid valve 4, and then discharged into the outside air. Thus, tank 1 is gradually decompressed. When the pressure of the tank is reduced to a predetermined level, the nitrogen having so far been adsorbed by adsorbent 10 starts to be released. The residual gas, consisting mainly of the released nitrogen gas, is discharged through second solenoid valve 4 into the outside air. When valves 2 and 4 are switched off after the discharge of the residual gas is finished, free-piston pump unit 3 operates as a compressor, so that air is resupplied into gas separation tank 1 under pressure.

Thus, oxygen in air is separated and extracted in succession by switching three-way solenoid valves 2 and 4 and repeating the pressurization and decompression of gas separation tank 1.

The following is a description of a balance valve according to the present invention.

Figure 2:
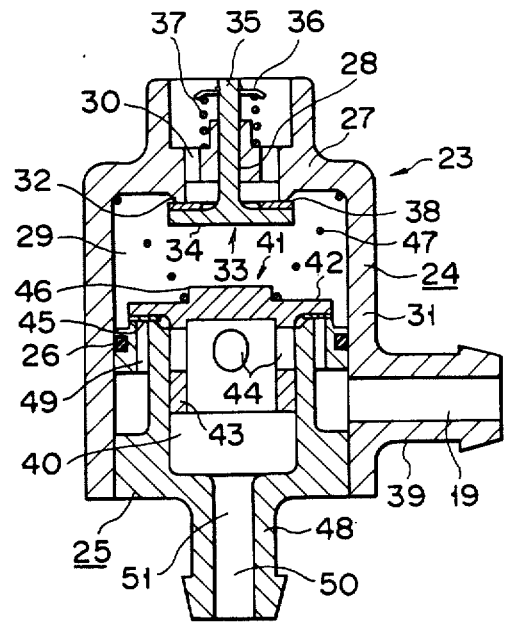
FIG. 2 is a sectional view of a balance valve according to the first embodiment of the invention.

FIG. 2 is a sectional view showing balance valve 23 in detail. As shown in FIG. 2, a body of valve 23 is composed of socket housing 24 and plug housing 25 which is fixedly fitted airtight in housing 24 with the aid of O-ring 26. Valve chamber 29 is defined inside the valve body. Slide hole 28 is bored through the center of top wall 27 of socket housing 24, and gas intake hole 30 is formed concentrically around hole 28. Ring-shaped valve seat 32 protrudes from the inside of top wall 27 so as to surround intake hole 30. Tube 39 for the connection of a hose or the like protrudes outward from peripheral wall 31 of socket housing 24. It has compressed-gas outlet hole 19 which is coupled to inlet port 6 of gas separation tank 1.

Gas intake hole 30 is opened and closed by means of negative-pressure valve 33. Valve 33 includes disk-shaped valve plate 34 and valve rod 35 protruding from the central portion of plate 34. Rod 35 is slidably inserted in slide hole 28 from the side of valve chamber 29, and its tip end portion protrudes outward through top wall 27. Also, spring holder 36 is mounted on the tip end portion of valve rod 35, and compressed spring 37 is fitted between holder 36 and wall 27. Seal member 38, formed of a rubber sheet or the like, is pasted on valve plate 34, and the surface of seal member 38 is pressed against valve seat 32 by the urging force of spring 37, thereby closing gas intake hole 30.

Meanwhile, valve insertion hole 40 with a relatively large diameter is formed in plug housing 25 which is opposed to valve chamber 29, and concentric annular hole 49 is formed outside housing 25. Hole 49, which communicates with the hole of tube 39, constitutes part of gas outlet hole 19.

Pressure valve 41 is fitted in valve insertion hole 40. It includes closing plate 42 and cylindrical wall 43 protruding vertically from the central portion of plate 42. A plurality of communication holes 44 are formed at regular circumferential intervals in the periphery of wall 43. Seal member 45, formed of a rubber sheet or the like, is pasted on that surface of a collar of closing plate 42 which faces plug housing 25. Spring bearing projection 46 is formed on the central portion of the top surface of plate 42. One end of compressed urging spring 47 is engagedly anchored to projection 46, while the other end of spring 47 is anchored to top wall 27.

When pressure valve 41 is set in place, it is urged toward plug housing 25 by means of urging spring 47, so that seal member 4 closes valve insertion hole 40 and compressed-gas outlet hole 19.

Tube portion 48 for the connection of a hose or the like protrudes outward from the bottom end portion of plug housing 25. Tube hole 50 inside portion 48 communicates with valve insertion hole 40, and holes 40 and 50 constitute gas inlet hole 51.

Inlet hole 51 of balance valve 23 is connected to second three-way solenoid valve 4 by means of the hose or the like. Likewise, compressed-gas outlet hole 19 is connected to inlet port 6 of gas separation tank 1 by means of the hose. When this balance valve is switched from a decompressive exhaust mode to a compressive supply mode for tank 1, pressure valve 41 is subjected to a force in the closing direction by its own weight, a sucking force from tank 1 under vacuum, and the urging force of urging spring 47. At the same time, valve 41 is subjected to a hoisting force by compressed air fed into inlet hole 51. In this embodiment, the sectional opening area of inlet hole 51 is sufficiently larger than that of compressed-gas outlet hole 19. Thus, when the compressed air is fed into hole 51 to develop a predetermined pressure, pressure valve 41 opens resisting the force in the closing direction.

In the gas separation/extraction apparatus of this embodiment constructed as aforesaid, three-way solenoid valves 2 (S1) and 4 (S2) are simultaneously switched not only on but also off.

When solenoid valves 2 and 4 are ON, gas separation tank 1 is decompressed in the same manner as in the conventional case, and the residual gas in tank 1 evacuated by free-piston pump unit 3 is discharged through second three-way solenoid valve 4.

Then, solenoid valves 2 and 4 are simultaneously turned off during the process of compression of gas separation tank 1. In doing this, in contrast with the conventional case, free piston 15 can be prevented from running against head-side end face 21 by the action of balance valve 23, in the following manner.

First, immediately before solenoid valves 2 and 4 are turned off, gas separation tank 1 is under vacuum, so that pressure valve 41 is subjected to a sucking force through compressed gas outlet hole 19. Further, valve 41 is pressed against the end face of plug housing 25 by its own weight and the urging force of urging spring 47, thereby closing inlet hole 51 and outlet hole 19. When solenoid valves 2 and 4 are turned off in this state, hole 51 connects with discharge port 12 of free-piston pump unit 3, and compressed air from pump unit 3 urges pressure valve 41 to be forced up. At this point of time, valve 41 is closed by a closing force attributable to its own weight and the urging force of spring 47. When the pressure of the compressed air from pump unit 3 increases to resist the closing force, however, valve 41 opens, thereby allowing the compressed air to enter valve chamber 29. At the same time, pressure valve 41 is pushed up to cause compressed-gas outlet hole 19 to open, so that chamber 29 communicates with gas separation tank 1 under vacuum. Thus, chamber 29 is subjected to vacuum suction from tank 1.

More specifically, valve chamber 29 is simultaneously subjected to the effect of pressure increase due to the compressed air introduced through inlet hole 51 and the effect of pressure reduction on the side of compressed-gas outlet hole 19. Initially, the effect of pressure reduction is initially superior, so that the pressure inside chamber 29 becomes lower than the pressure on the side of gas intake hole 30 (ambient pressure in this embodiment). As a result, negative-pressure valve 33 is opened by the difference between the pressure inside chamber 29 and the outside air pressure, so that plenty of air enters chamber 29 via intake hole 30. Thus, a great quantity of air introduced through gas intake hole 30 and inlet hole 51 enters gas separation tank 1 via compressed-gas outlet hole 19, so that the pressure inside tank 1 increases in an instant. At the time of this vacuum breakage, cylinder chamber 18 of free-piston pump unit 3 communicates indirectly with tank 1 under vacuum by means of valve chamber 29, without being connected directly to the tank. Plenty of air enters chamber 29 via gas intake hole 30, thereby lessening the pressure reduction in chamber 29. Thus, valve chamber 29 serves as a pressure relief chamber to prevent the vacuum pressure in gas separation tank 1 from being transmitted directly to cylinder chamber 18. Even though solenoid valves 2 and 4 are simultaneously turned off, therefore, chamber 18 cannot be decompressed to reduce its bumper effect for free piston 15. Accordingly, piston 15 can never run against head-side end face 21.

Since the pressure inside valve chamber 29 is restored substantially to the level of the atmospheric pressure by the time when the vacuum breakage in gas separation tank 1 is finished, so negative-pressure valve 33, receiving the urging force of spring 37, closes gas intake hole 30. After hole 30 is closed, the compressed air supplied through inlet hole 51 are fed through gas outlet hole 19 into tank 1. As the pressure of tank 1 increases, oxygen is separated and extracted to achieve the object.

Figure 3:
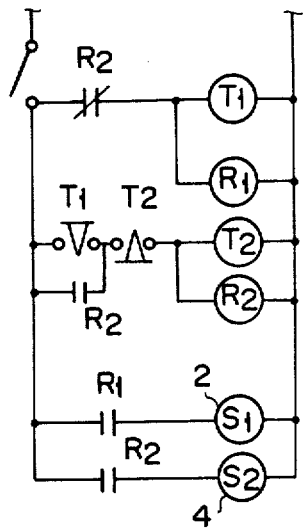
FIG. 3 is a circuit diagram of a controller of the gas separation/extraction apparatus.
Figure 4:
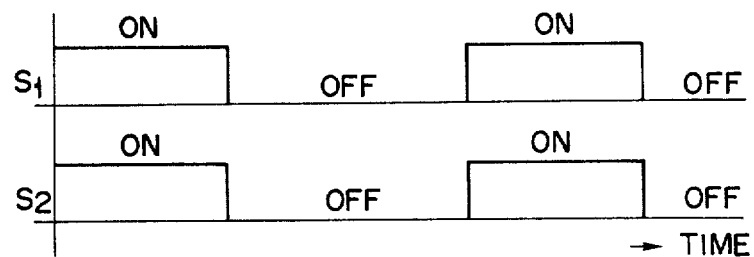
FIG. 4 is a time chart of a three-way solenoid valve shown in FIG. 1A.

In the gas separation/extraction apparatus according to the present embodiment, first and second three-way solenoid valves 2 (S1) and 4 (S2) are driven by means of a circuit shown in FIG. 3. In this embodiment, the circuit configuration is very simple.

In the present embodiment, moreover, three-way solenoid valves 2 and 4 are simultaneously ON-OFF controlled, as mentioned before, so that the circuit design is also very easy.

Figure 5:
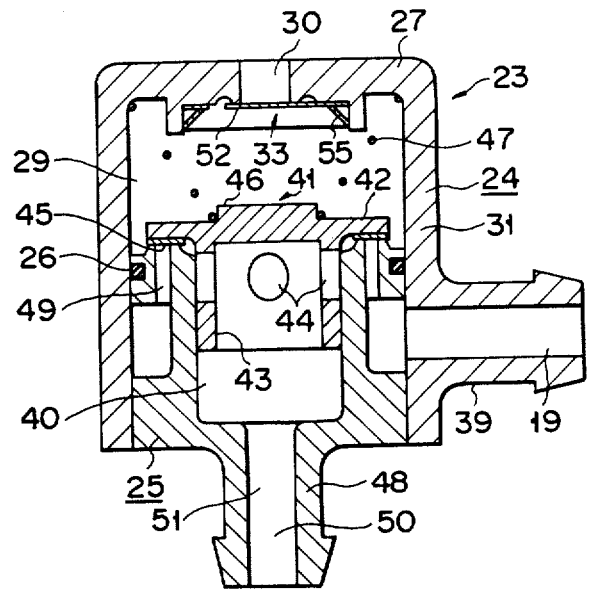
FIG. 5 is a sectional view showing a modification of the balance valve.
Figure 6:
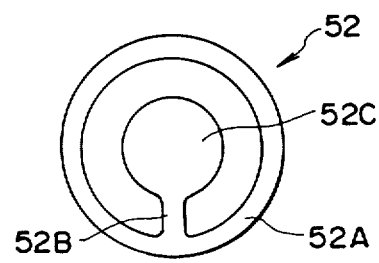
FIG. 6 is a plan view of a leaf spring shown in FIG. 5.

FIG. 5 shows a modification of balance valve 23. Valve 23 of this modification includes negative-pressure valve 33 formed of simple leaf spring 52 of stainless steel or the like. In spring 52, as shown in FIG. 6, elastic flexible portion 52B extends from ring-shaped edge portion 52A toward the center, and closing plate 52C for closing gas intake hole 30 is formed on the free end of flexible portion 52B.

Edge portion 52A of leaf spring 52 is held down and fixed to top wall 27 of socket housing 24 by means of retaining means 55, such as a retainer.

With use of leaf spring 52 as negative-pressure valve 33, the vacuum breakage in gas separation tank 1 can be achieved more quickly than by the use of balance valve 23 shown in FIG. 2. In the case of valve 23 of FIG. 2, the airtightness of negative-pressure valve 33 is so good that the air confined under a relatively high pressure in valve chamber 29 cannot leak to the outside through gas intake hole 30 during the decompressive exhaust of tank 1 (or wile solenoid valves 2 and 4 are ON). Therefore, it takes some time for the pressure inside valve chamber 29 to be lowered to produce differential pressure such that valve 33 opens, after the operation mode of ga separation tank 1 is switched to the compressive supply mode.

In balance valve 23 of FIG. 5 having leaf spring 52 as negative-pressure valve 33, on the other hand, gas intake hole 30 cannot be perfectly closed, so that the high-pressure air in valve chamber 29 leaks through hole 30 during the decompressive exhaust of gas separation tank 1. Before the operation of tank 1 is switched to the compressive supply mode, therefore, the pressure inside chamber 29 is lowered to a level just a little higher than the atmospheric pressure. Thus, when tank 1 is switched to the compressive supply mode, the pressure inside valve chamber 29 is instantaneously lowered, by suction from the tank, to produce a differential pressure such that negative-pressure valve 33 opens. In consequence, the efficiency of oxygen separation is further improved.

It is to be understood that the present invention is not limited to the embodiment described above, and that various changes and modifications may be effected therein by one skilled in the art without departing from the scope or spirit of the invention. In the above embodiment, for example, air is used as the gas mixture, and oxygen is separated from it. Alternatively, however, various other gases, including coke oven gas, converter gas, combustion gas, etc., may be used as the gas mixture, and various specific gases, such as hydrogen, carbon monoxide, carbon dioxide, etc., may be separated an extracted correspondingly.

If balance valve 23 is not placed in the gas mixture, in this case, gas intake hole 30 must be caused to communicate with the gas mixture by means of a hose or the like. Adsorbent 10 is used corresponding to the type of the gas mixture used.

The following is a description of a gas separation/extraction apparatus according to a second embodiment of the present invention.

Figure 7:
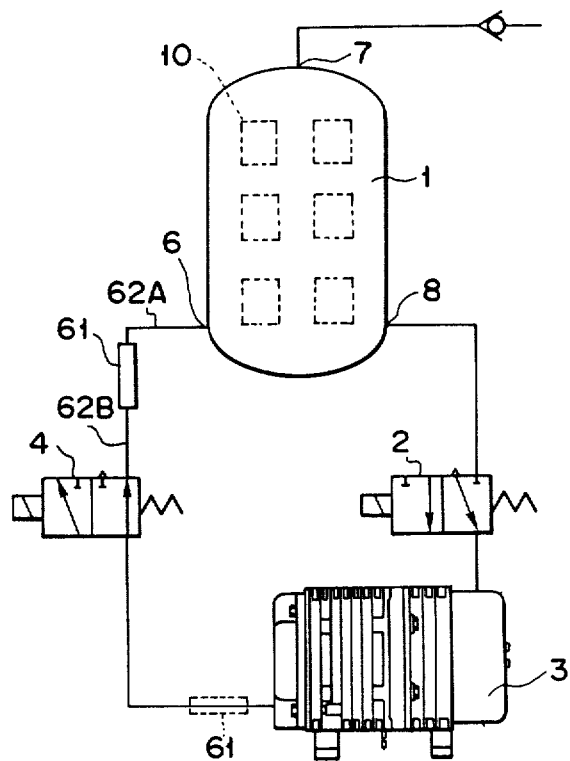
FIG. 7 is a fluid circuit diagram of a gas separation/extraction apparatus according to a second embodiment of the invention.
Figure 8:
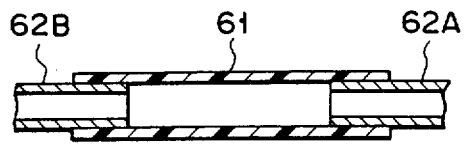
FIGS. 8 and 9 are longitudinal sectional views of a flexible tube according to the second embodiment.
Figure 9:
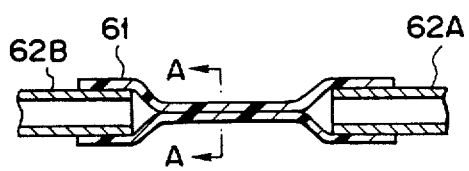

In this gas separation/extraction apparatus, as shown in FIG. 7, flexible tube 61, having a suitable length, inside diameter, and wall thickness, is provided between second three-way solenoid valve 4 and gas inlet port 6 of gas separation tank 1. As shown in FIG. 8, tube 61 is fixedly fitted on pipes 62A and 62B which connects with tank 1 and valve 4, respectively. This flexible tube is designed to close part of a pipeline extending from tank 1 to free-piston pump unit 3, before the pressure inside the pipeline attains a low pressure such that a piston shock is caused. Therefore, tube 61 must be able to be easily collapsed flat, as shown in FIG. 9, by vacuum sucking force. To attain this, a flexible or elastic member is used as tube 61. In this embodiment, a rubber or plastic tube is used for this purpose. On the other hand, pipes 62A and 62B on either side of tube 61, which are connected to gas separation tank 1 and second three-way solenoid valve 4, respectively, are formed of rigid pipes or flexible tubes which cannot be collapsed by negative pressure. The diameter, wall thickness, length, elasticity, etc. of tube 61 are set corresponding to the sucking and pressurizing capabilities of free-piston pump unit 3. If pump unit 3 is liable to cause a piston shock, tube 61 must be increased in diameter or length or reduced in wall thickness, in order that the tube can be easily collapsed by even a small vacuum sucking force. If pump unit 3 is not liable to cause a piston shock, on the other hand, tube 61 must be reduced in diameter or length or increased in wall thickness, to obtain higher resistance to collapse.

The following is a description of an effect of piston shock prevention of the second embodiment.

Figure 10:
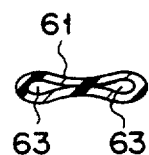
FIG. 10 is a cross-sectional view taken along line A—A of FIG. 9.
Figure 11:
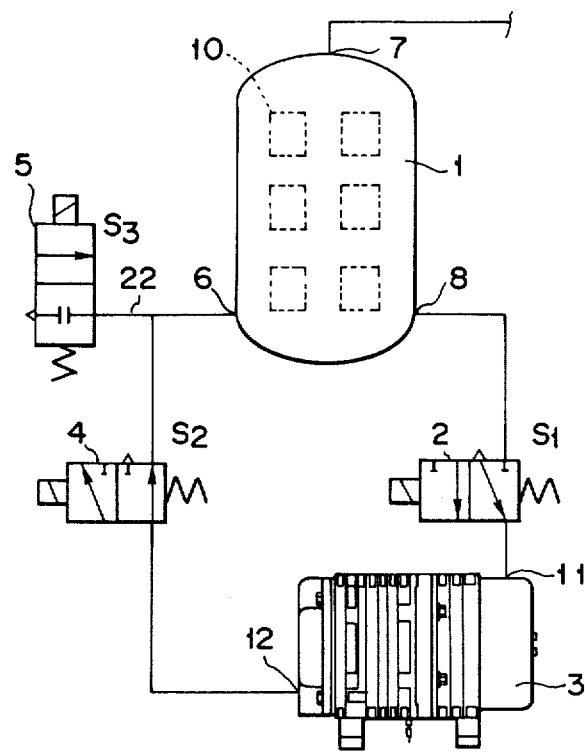
FIG. 11 is a fluid circuit diagram showing a trial machine as an example of the gas separation/extraction apparatus.
Figure 12A:
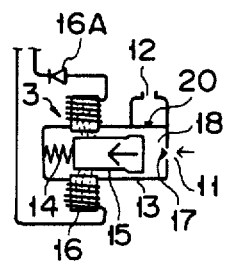
FIGS. 12A and 12B are schematic sectional views illustrating the operation of a pump unit shown in FIG. 11.
Figure 12B:
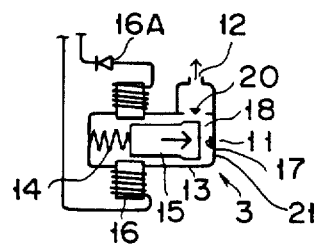
Figure 13:
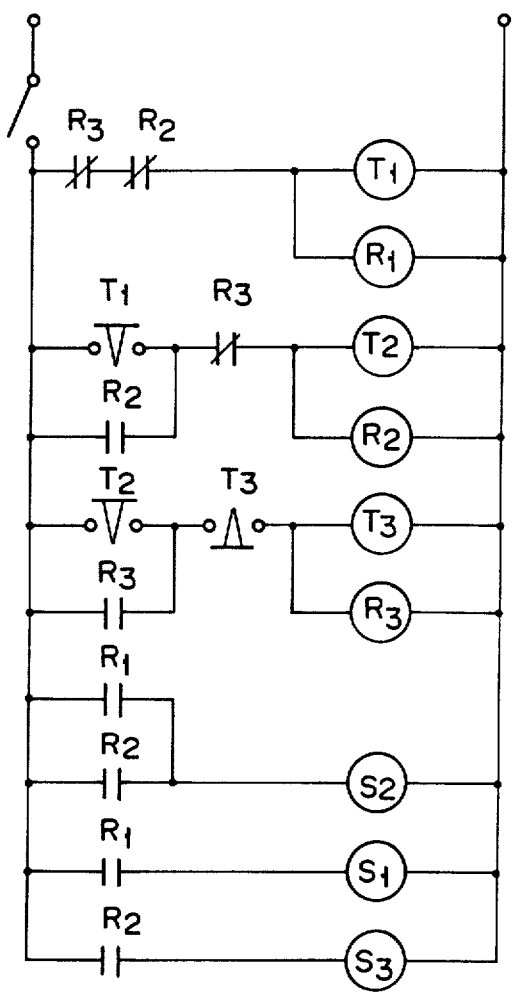
FIG. 13 is a circuit diagram of a controller of the apparatus shown in FIG. 11.
Figure 14:
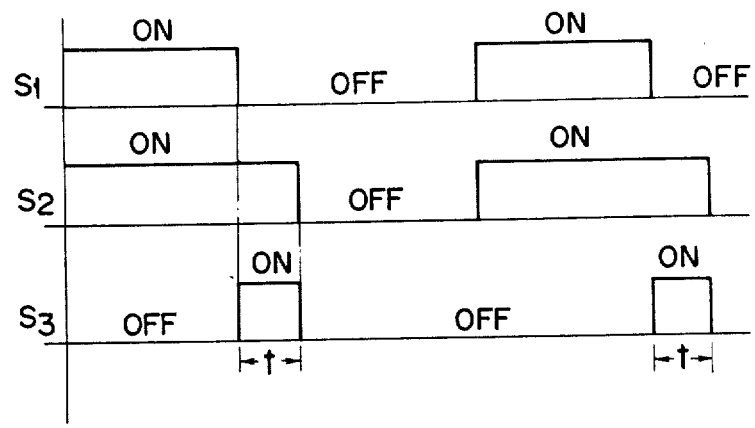
FIG. 14 is a time chart of a solenoid valve shown in FIG. 11.

First, when free-piston pump unit 3 is in the decompression mode, the air in gas separation tank 1 is sucked through first three-way solenoid valve 2 by pump unit 3, and is then discharged into the atmosphere via second three-way solenoid valve 4. As a result, tank 1 is gradually decompressed. At this time, valve 4 closes an end of pipe 62B which connects with gas inlet port 6 of tank 1. When the pressure of tank 1 is reduced, therefore, the resulting force of negative pressure influences tube 61. Thus, tube 61 is collapsed flat, as shown in FIG. 10, by the resulting sucking force.

Subsequently, when three-way solenoid valves 2 and 4 are turned off, first solenoid valve 2 closes its first port connecting with gas separation tank 1 and opens another port which communicates with the atmosphere. Second solenoid valve 4 opens its first port connecting with tank 1 and closes another port which communicates with the atmosphere. Thereupon, freepiston pump unit 3 is switched from the decompression mode to the pressurization mode. When tank 1 is decompressed, pipes 62A and 62B, which connect the tank and second solenoid valve 4, or at least pipe 62A is also decompressed. The moment pump unit 3 is switched to the pressurization mode, therefore, the forces of negative pressure in gas separation tank 1 and pipe 62A tend to influence pump unit 3. Since tube 61 is collapsed, however, the residual air in cylinder chamber 18 of pump unit 3 cannot be sucked by the force of negative pressure inside tank 1. Thus, the discharge side of pump unit 3 is kept at a pressure approximate to the atmospheric pressure. Since tube 61 is still collapsed, on the other hand, the pressure inside cylinder chamber 18 of freepiston pump unit 3 is not negative when the pump unit is switched to the pressurization mode. Accordingly, the compressed gas is discharged into gas separation tank 1. In doing this, the compressed gas gets into tank 1 through narrow spaces 63 of tube 61, so that the resistance of the gas flowing through spaces 63 acts as a load pressure on discharge valve 20 in cylinder chamber 18, on the discharge side of pump unit 3. Thus, the resistance produces a bumper effect at the top dead point of free piston 15 which moves toward head-side end face 21. Piston 15, subjected to the bumper effect in this manner, is restrained from overrunning in the direction for compression. In consequence, piston 15 can be securely prevented from running against end face 21.

As free piston 15 is thus prevented from running against head-side end face 21, free-piston pump unit 3 can operate normally. The compressed gas produced in cylinder chamber 18 and is fed into gas separation tank 1, while gradually pressurizing spaces 63 of tube 61, thereby restoring the tube to its original shape. Thus supplied with the compressed gas, tank 1 gradually increases its internal pressure. On the other hand, the force to give a piston shock to chamber 18 of pump unit 3 gradually lessens. As the pressurization of freepiston pump unit 3 advances in this manner, thereby rapidly increasing the pressure inside tank 1, the desired gas is separated. In the present embodiment, the gas obtained is enriched oxygen gas.

It is to be understood that the present invention is not limited to the embodiments described above. Alternatively, for example, flexible tube 61 may be additionally provided between free-piston pump unit 3 and second three-way solenoid valve 4, as shown by the broken line in FIG. 7.

What is claimed is:

1. A gas separation/extraction apparatus comprising:
    tank means for separating and extracting a specific gas element from a gas mixture, said tank means having an suction port, an exhaust port, and adsorption means for adsorbing the gas element from the gas mixture;
    pump means having a suction port, a discharge port, a cylinder, and a piston housed in the cylinder, for alternately pressurizing and decompressing the inside of the tank means as the piston reciprocates;
    a first three-way solenoid valve connected between the exhaust port of the tank means and the suction port of the pump means;
    a second three-way solenoid valve connected between the discharge port of the pump means and the suction port of the tank means; and
    pressure balance means connected between the second three-way solenoid valve and the suction port of the tank means, for gradually eliminating a difference in pressure between the tank means and the pump means as the tank means is switched from a decompressed state to a pressurized state.

2. The gas separation/extraction apparatus according to claim 1, wherein said pressure balance means includes a balance valve having a valve chamber, negative-pressure valve means for introducing the gas mixture into the valve chamber, and pressure valve means for disconnecting the suction port of the tank means from the valve chamber when the tank means is switched from the decompressed state to the pressurized state.

3. The gas separation/extraction apparatus according to claim 1, wherein said pressure balance means includes a flexible tube, whereby a gas passage between the second three-way solenoid valve and the suction port of the tank means is closed when the tank means is decompressed, and the gas passage is temporarily kept closed by a negative pressure inside the tank means when the internal pressure of the tank means is changed from negative to positive.

4. A balance valve used in a gas separation/extraction apparatus which has a gas separation tank and a pump unit, comprising:
    an intake port for a gas mixture;
    an outlet port through which a compressed gas flows out into the gas separation tank;
    an inlet port for the compressed gas connecting with a discharge port of the pump unit;
    a negative-pressure valve for opening and closing the intake port for the gas mixture; and
    a pressure valve for opening and closing the inlet port for the compressed gas.

* * * * *